(12) United States Patent
Kasai et al.

(10) Patent No.: US 10,688,856 B2
(45) Date of Patent: Jun. 23, 2020

(54) VEHICLE FLOOR STRUCTURE

(71) Applicant: TOYOTA JIDOSHA KABUSHIKI KAISHA, Aichi-ken (JP)

(72) Inventors: Satoshi Kasai, Nagoya (JP); Shinobu Tanaka, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/257,334

(22) Filed: Jan. 25, 2019

(65) Prior Publication Data

US 2019/0232773 A1 Aug. 1, 2019

(30) Foreign Application Priority Data

Jan. 30, 2018 (JP) .................. 2018-013426

(51) Int. Cl.
  *B60K 1/04* (2019.01)
  *B60L 50/64* (2019.01)
  *B62D 25/20* (2006.01)
  *B62D 21/15* (2006.01)

(52) U.S. Cl.
  CPC ............... *B60K 1/04* (2013.01); *B60L 50/64* (2019.02); *B62D 21/157* (2013.01); *B62D 25/20* (2013.01); *B60K 2001/0433* (2013.01); *B60K 2001/0438* (2013.01); *B60Y 2306/01* (2013.01)

(58) Field of Classification Search
  CPC ................... B60K 2001/0438; B60Y 2306/01
  See application file for complete search history.

(56) References Cited

U.S. PATENT DOCUMENTS

| 8,167,360 | B2* | 5/2012 | Deng | B60N 2/4235 296/187.08 |
|---|---|---|---|---|
| 2013/0026786 | A1* | 1/2013 | Saeki | B60K 1/04 296/187.12 |
| 2013/0118824 | A1* | 5/2013 | Maeda | B62D 21/157 180/68.5 |
| 2014/0021744 | A1* | 1/2014 | Imamura | B62D 21/157 296/187.08 |
| 2014/0327268 | A1* | 11/2014 | Mori | B62D 21/157 296/187.08 |
| 2016/0251034 | A1* | 9/2016 | Kumagai | B62D 25/025 296/187.08 |
| 2016/0257187 | A1* | 9/2016 | Nakajima | B60K 1/04 |
| 2017/0217297 | A1* | 8/2017 | Li | B60K 1/04 |
| 2018/0222535 | A1* | 8/2018 | Tanabe | B62D 21/02 |
| 2018/0237075 | A1* | 8/2018 | Kawabe | B60L 50/66 |

FOREIGN PATENT DOCUMENTS

JP      2017-193291 A      10/2017

* cited by examiner

*Primary Examiner* — Brian L Swenson
(74) *Attorney, Agent, or Firm* — Hauptman Ham, LLP

(57) ABSTRACT

A floor structure has a floor panel, a battery pack, and floor cross members. The battery pack is disposed under the floor panel. The floor cross members are disposed on the floor panel and extend from one end to the other end of the floor panel in the vehicle width direction. The floor cross members include deformation starting portions in which bases are raised. Dimensions in a vehicle height direction of the deformation starting portions are shorter than dimensions of areas of the floor cross members in a vehicle width direction other than the deformation starting portion.

4 Claims, 5 Drawing Sheets

VEHICLE FLOOR STRUCTURE

INCORPORATION BY REFERENCE

The disclosure of Japanese Patent Application No. 2018-013426 filed on Jan. 30, 2018 including the specification, drawings and abstract is incorporated herein by reference in its entirety.

BACKGROUND

1. Technical Field

The present disclosure relates to a vehicle floor structure.

2. Description of Related Art

A battery is installed in an electric vehicle in which a rotary electric machine is installed as a driving source. For example, in Japanese Patent Application Publication No. 2017-193291 (JP 2017-193291 A), a battery pack is installed under a floor panel that is a floor board of a cabin.

The battery pack has a plurality of battery modules and a case that houses the battery modules. In JP 2017-193291 A, an upper reinforcement member is provided in close contact with a lower surface of an upper lid in order to reinforce the upper lid of a case. The upper reinforcement member extends in a vehicle width direction, and a center portion of the upper reinforcement member in the vehicle width direction is recessed downward.

SUMMARY

Upon vehicle side surface collision (hereinafter appropriately referred to as side collision), a skeleton member and a reinforcement member extend in a vehicle width direction receive a collision load. Thus, an upper reinforcement member that extends in the vehicle width direction also receives a load in the vehicle width direction.

When the upper reinforcement member bends and deforms by receiving the load, a relatively fragile part becomes a bending starting point and a shape thereof determines the way in which bending and deformation occur (way of bending).

In the upper reinforcement member disclosed in JP 2017-193291 A, a recessed portion that is recessed downward is formed at a center portion in the vehicle width direction. The recessed portion is a bending starting point. Due to the shape that is recessed downward, the upper reinforcement member is bent so that the recessed portion is projected downward. Hereinafter, the way of bending downward will be referred to as "downward bending" as appropriate.

The upper reinforcement member is attached to the upper lid of the battery pack. Thus, if downward bending occurs, there is a possibility of the upper reinforcement member being in contact with the battery module that is disposed underneath. In order to avoid this kind of contact, there is a need to secure beforehand, a wide clearance between the upper reinforcement member and the battery module in the up-down direction. Therefore, there is room for improvement regarding reduction in thickness of a battery pack.

The present disclosure provides a vehicle floor structure in which a battery pack housing a battery module is installed under a floor panel, and which can suppress bending and deformation of a skeleton member to a battery module side.

The present disclosure relates to a vehicle floor structure. The floor structure has a floor panel, a battery pack, and floor cross members. The battery pack is disposed under the floor panel. The floor cross member is disposed on the floor panel. The floor cross member extends from one end to the other end of the floor panel in a vehicle width direction. The floor cross member includes a deformation starting portion in which a base is raised. A dimension, in a vehicle height direction, of the deformation starting portion of the floor cross member is shorter than a dimension, in the vehicle height direction, of an area of the floor cross member other than the deformation starting portion in the vehicle width direction.

With the configuration described above, the deformation starting portion of the floor cross member is formed by raising the base. Thus, upon vehicle side collision, the floor cross member is bent upwards, thereby suppressing contact between the floor cross member and the battery pack that is under the floor panel.

The present disclosure described above may have a reinforcement member that is disposed so as to be superposed on the deformation starting portion of the floor cross member.

In the configuration described above, when the floor cross member is bent and deformed upwards, the reinforcement member superposed on the deformation starting portion suppresses rising of the deformation starting portion. Thus, it is possible to suppress the progress of bending and deformation of the floor cross member.

In the present disclosure described above, the battery pack may include a battery module and a case that houses the battery module. The case and the floor panel may each have a projecting portion that projects upward along the base of the deformation starting portion at a part that is located under the deformation starting portion of the floor cross member. The battery pack may include a wire harness that is routed through a clearance between the projecting portion of the case and the battery module housed in the case.

In the configuration described above, the clearance that is created with the formation of the deformation starting portion is used as a routing space for the wire harness.

With the present disclosure, it is possible to suppress bending and deformation of the skeleton member to the battery module side upon side collision.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

A vehicle floor structure according to the present embodiment will be described with reference to FIGS. 1 to 5. In FIGS. 1 to 5, a front-rear direction of the vehicle (hereinafter referred to as a vehicle length direction) is indicated by an axis FR. A width direction of the vehicle (hereinafter referred to as a vehicle width direction) is indicated by an axis RW. A vertical direction (hereinafter referred to as a vehicle height direction) is indicated by an axis UP. The sign FR indicates a forward direction of the vehicle. The sign RW indicates a right direction of the vehicle. The sign UP indicates an upward direction of the vehicle.

Figure 1:
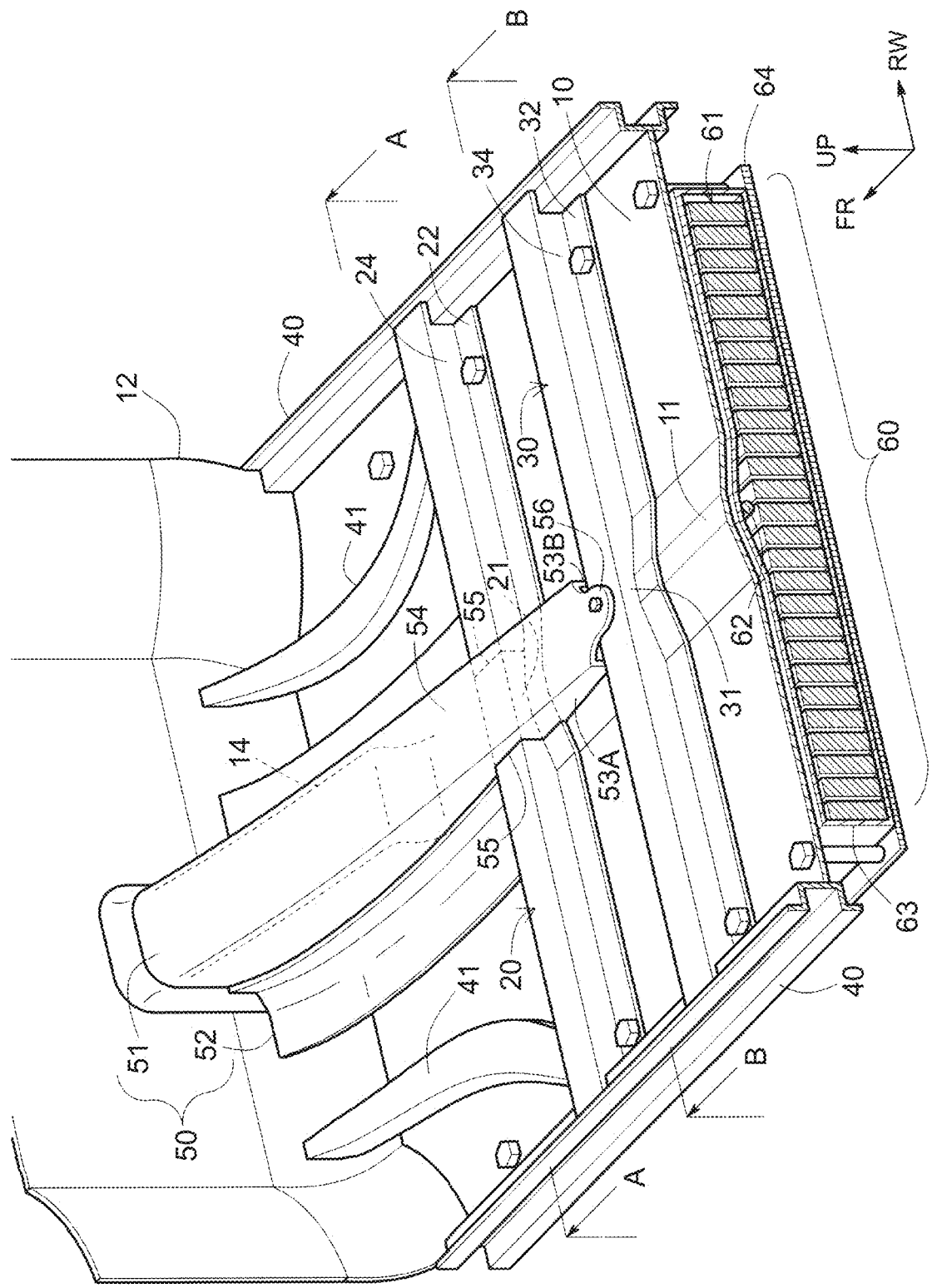
FIG. 1 is a perspective view of an example of a vehicle floor structure according to the present embodiment.
Figure 2:
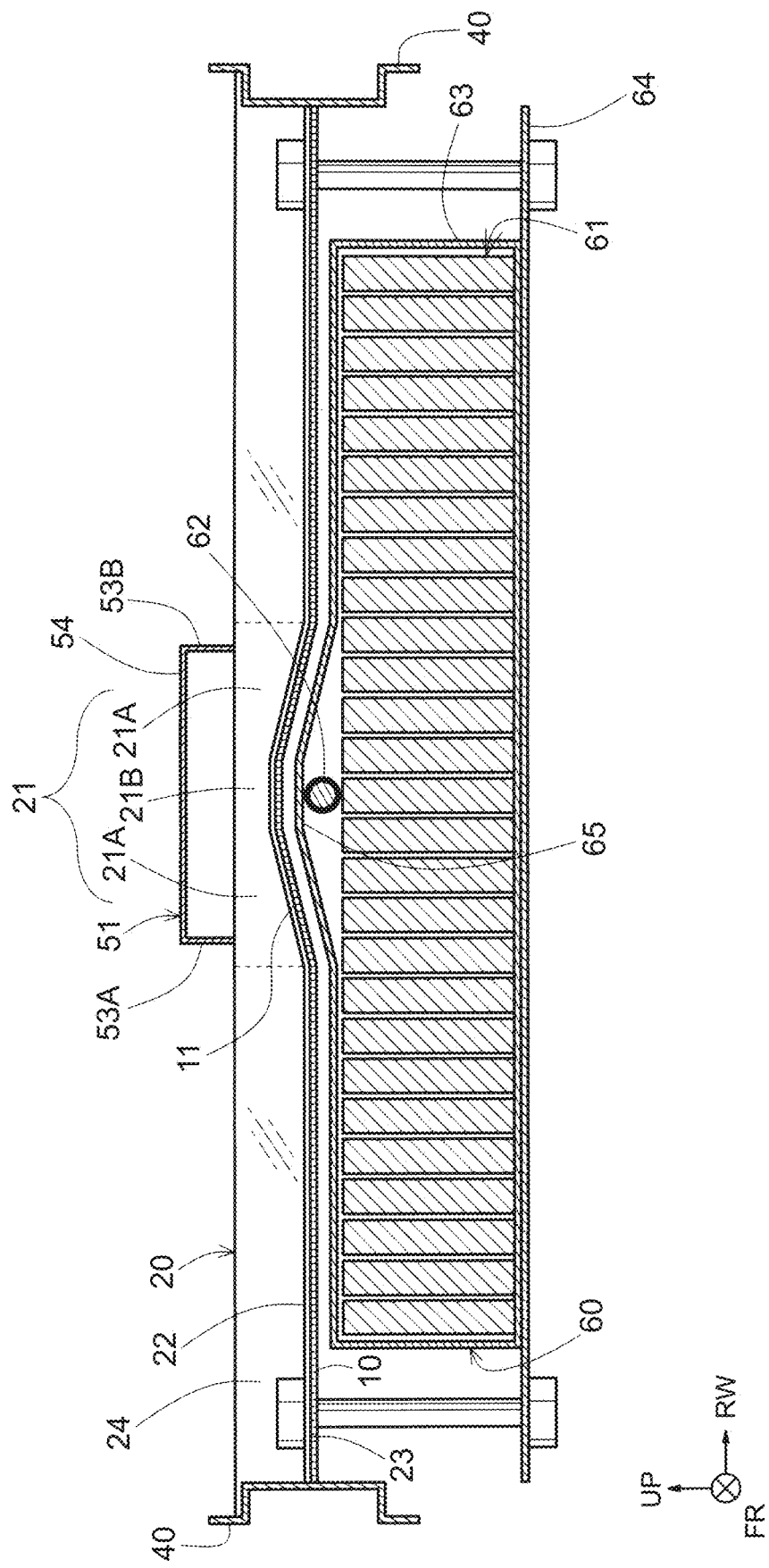
FIG. 2 is a sectional rear view taken along line A-A in FIG. 1.
Figure 3:
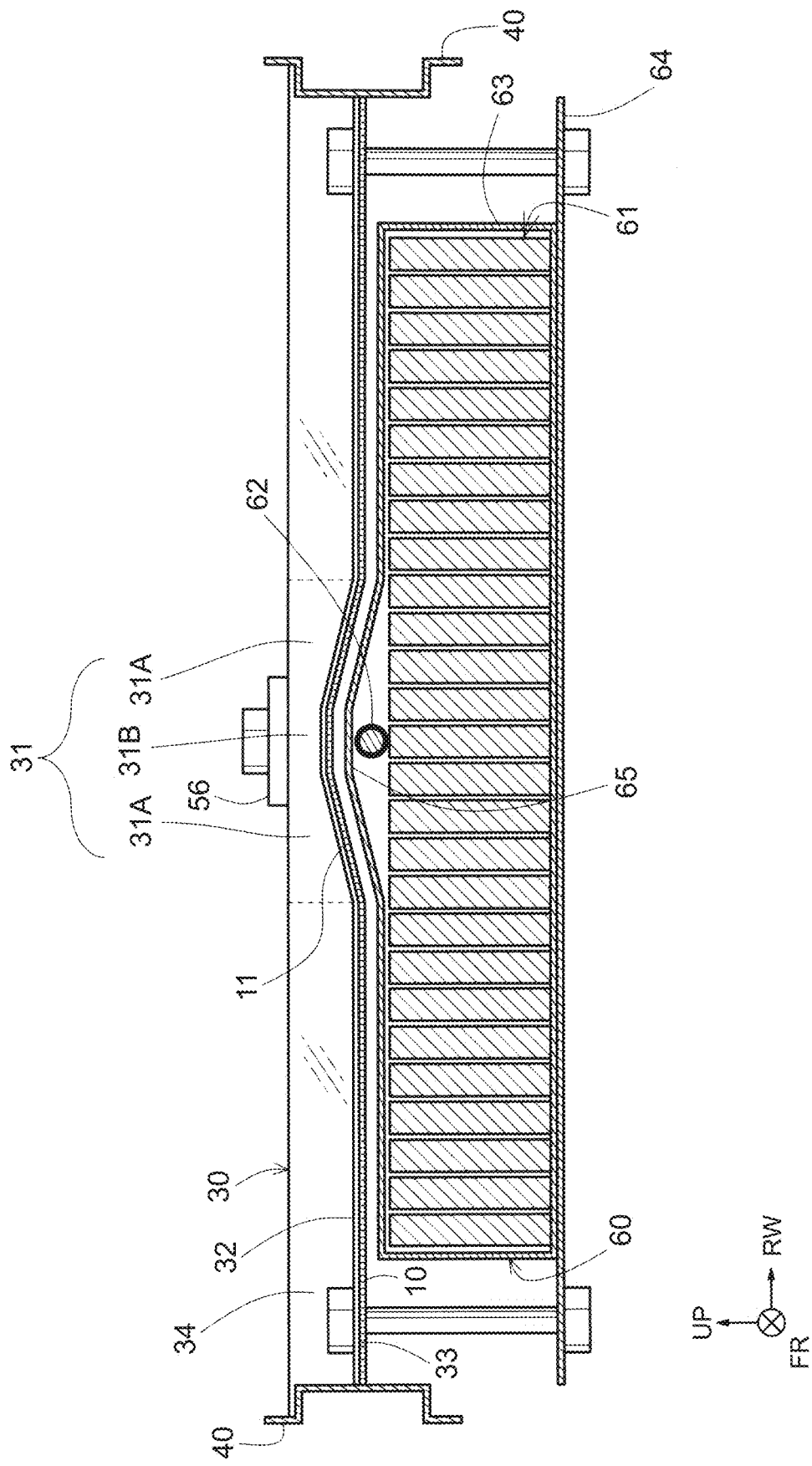
FIG. 3 is a sectional rear view taken along line B-B in FIG. 1.

FIG. 1 illustrates the vehicle floor structure according to the present embodiment. FIG. 2 illustrates a sectional rear view taken along line A-A in FIG. 1. FIG. 3 illustrates a sectional rear view taken along line B-B in FIG. 1. The floor structure according to the present embodiment is installed in an electric vehicle, for example.

The floor structure according to the present embodiment includes a floor panel 10, a first floor cross member 20, a second floor cross member 30, rocker beams 40, 40, a tunnel reinforcement member 50, and a battery pack 60. The floor panel 10 is a panel member that constitutes a floor board of a cabin. A front end of the floor panel 10 is connected to a dash panel 12. A floor tunnel 14 is provided at the front end of the floor panel 10 at a center portion in the vehicle width direction.

The floor tunnel 14 is disposed to extend from the front end of the cabin toward the rear of the cabin. The floor tunnel 14 is projected upward from a floor surface of the cabin, that is, an upper surface of the floor panel 10. For example, the floor tunnel 14 is hat-shaped when viewed from the front, and has a pair of side walls that face each other in the vehicle width direction and an upper wall that connects upper ends of the side walls with each other.

A front end of the floor tunnel 14 is connected to the dash panel 12. A height of the upper wall, which is a roof (tunnel root) of the floor tunnel 14, from the floor surface (floor panel upper surface) gradually becomes lower toward the rear of the cabin, as indicated by a broken line in FIG. 1. A rear end of the floor tunnel 14 is connected to the floor panel 10.

In the case where an internal combustion engine is installed in a vehicle as a driving source, an exhaust pipe is passed through the floor tunnel 14. However, suppose the vehicle in concern is an electric vehicle in which an internal combustion engine is not installed and the battery pack 60 is stored under the floor, as illustrated in FIG. 1. In such a case, peripheral devices of the battery pack 60 such as a battery control unit (not shown) that manages and monitors electric power of the battery pack 60 are housed in the floor tunnel 14.

In the electric vehicle, the floor tunnel 14 does not need to extend to the rear of the vehicle, unlike the case in which the exhaust pipe is passed through the floor tunnel 14. As shown in FIG. 1, a length of the floor tunnel 14 in the vehicle length direction may be set to a length in which the rear end of the floor tunnel 14 is positioned forward of a first floor cross member 20 in the vehicle length direction.

The tunnel reinforcement member 50 is provided as a reinforcement member that covers the floor tunnel 14. The tunnel reinforcement member 50 is formed to have higher rigidity than the floor tunnel 14. Similar to the floor tunnel 14, the tunnel reinforcement member 50 is projected upward from the upper surface of the floor panel 10 (cabin floor surface) and extends in the vehicle length direction. In FIG. 1, the part of the floor tunnel 14 that is covered by the tunnel reinforcement member 50 is indicated by a broken line.

The tunnel reinforcement member 50 includes a tunnel reinforcement member upper portion 51 and a tunnel reinforcement member lower portion 52 that are an upper member and lower member of the tunnel reinforcement member 50, respectively. The tunnel reinforcement member lower portion 52 is joined with a lower portion of a side wall (such as a lower halt) of the floor tunnel 14, and is also bent and developed in the vehicle width direction so as to extend to the floor panel 10. Regarding the length in the vehicle length direction, the tunnel reinforcement member lower portion 52 extends to a front wall of the first floor cross member 20, for example.

The tunnel reinforcement member upper portion 51 may extend further rearward of the rear end of the floor tunnel 14. The tunnel reinforcement member upper portion 51 is disposed so as to extend over the first floor cross member 20 and the second floor cross member 30. That is, the tunnel reinforcement member upper portion 51 is disposed so as to be superposed on the first floor cross member 20 and the second floor cross member 30. More specifically, the tunnel reinforcement member upper portion 51 is disposed so as to intersect with the first floor cross member 20 and the second floor cross member 30 so that the tunnel reinforcement member upper portion 51 is superposed on deformation starting portions 21, 31 of the first floor cross member 20 and the second floor cross member 30.

An area from the rear end of the floor tunnel 14 to a rear end of the tunnel reinforcement member upper portion 51 has a closed cross section structure in which a cross section along the UP axis—RW axis plane (front view cross section) is defined by the tunnel reinforcement member upper portion 51 and the floor panel 10. A space defined by the closed cross section structure may be a so-called dead space in which an apparatus is not housed. The first floor cross member 20 crosses an inside of the dead space.

Referring to FIGS. 1 and 2, openings 55, 55 that extend through the tunnel reinforcement member upper portion 51 in the vehicle width direction are formed in a pair of side walls 53A, 53B of the tunnel reinforcement member upper portion 51. The side walls 53A, 53B face each other along the vehicle width direction. The openings 55, 55 are formed at a point where the tunnel reinforcement member upper portion 51 intersects with the first floor cross member 20. A shape of the openings 55, 55 may be similar to a shape of a cross section of the first floor cross member 20 in a side view (cross section along the UP axis—FR axis plane). For example, the openings 55, 55 may each have such an opening shape that there is a prescribed clearance between the openings 55, 55 and the cross section of the first floor cross member 20 in the side view.

The rear end of the tunnel reinforcement member upper portion 51 is disposed in front of the second floor cross member 30. For example, rear ends of the side walls 53A, 53B of the tunnel reinforcement member upper portion 51 abut against a front wall of the second floor cross member 30. A clearance along the vehicle length direction may otherwise be provided between the front wall of the second floor cross member 30 and the rear ends of the side walls 53A, 53B of the tunnel reinforcement member upper portion 51.

A rear end flange 56 is provided to extend rearward from a rear end of an upper wall 54 of the tunnel reinforcement member upper portion 51. The rear end flange 56 overlaps with an upper wall of the second floor cross member 30. The overlapping part is fastened by a fastening member such as a bolt or a nut.

A pair of the rocker beams 40, 40 are provided on opposite ends of the floor panel 10 in the vehicle width direction. The rocker beams 40, 40 are skeleton members extending in the vehicle length direction. Additionally, front side members 41, 41 are provided between the rocker beams 40, 40 and the floor tunnel 14.

The first floor cross member 20 and the second floor cross member 30 which are the skeleton members, extend from one end to the other end of the floor panel 10 in the vehicle width direction. For example, the first floor cross member 20 and the second floor cross member 30 connect the rocker beams 40, 40. The first floor cross member 20 and the second floor cross member 30 extend linearly along the vehicle width direction, for example. The first floor cross member 20 and the second floor cross member 30 are provided under front seats (driver's seat and passenger seat) of the cabin.

The first floor cross member 20 and the second floor cross member 30 are hat-shaped when viewed from the side, and are disposed with their open ends facing downward so as to form closed cross section structures, for example. Flanges 22, 32 of the first and second floor cross members 20, 30 having the hat-shape are joined to the floor panel 10 by welding etc.

As shown in FIGS. 1 and 2, the first floor cross member 20 extends through the tunnel reinforcement member upper portion 51. That is, the first floor cross member 20 is disposed so as to cross the inside of the tunnel reinforcement member upper portion 51 via (passing through) the openings 55, 55 of the tunnel reinforcement member upper portion 51.

In this way, the first floor cross member 20 according to the present embodiment extends through the tunnel reinforcement member upper portion 51 to extend between the rocker beams 40, 40 on the opposite ends in the vehicle width direction. Thus, strength against a load that is applied from sides of the cabin is improved, compared to the case where the first floor cross member 20 does not extend through the tunnel reinforcement member upper portion 51 and the floor tunnel 14 and is divided thereby in parts.

Referring to FIGS. 1 and 2, the deformation starting portion 21, in which a base 23 is raised, is formed on the first floor cross member 20. The deformation starting portion 21 is a step portion formed of a part of the base 23 of the first floor cross member 20 recessed upward. The deformation starting portion 21 is formed so that a dimension of the deformation starting portion 21 in the vehicle height direction is shorter than a dimension, in the vehicle height direction, of other areas of the first floor cross member 20 in the vehicle width direction. The base 23 of the first floor cross member 20 indicates a ridge between a vertical wall 24 that stands vertically and a flange 22 that is connected to a lower end of the vertical wall 24 and that extends in a horizontal direction.

The deformation starting portion 21 has, for example, slope portions 21A and a horizontal portion 21B. In each slope portion 21A, the base 23 is gradually raised along the vehicle width direction. In the horizontal portion 21B, the base 23 extends horizontally in the vehicle width direction. For example, the horizontal portion 21B is formed so that a dimension of the horizontal portion 21B in the vehicle height direction is half the dimension in the vehicle height direction of areas of the first floor cross member 20 other than the deformation starting portion 21.

The deformation starting portion 21 is formed at a center portion of the first floor cross member 20 in the vehicle width direction, for example. The tunnel reinforcement member upper portion 51 that is a reinforcement member is superposed on the deformation starting portion 21. With this configuration, when the upward bending deformation occurs in the first floor cross member 20 starting at the deformation starting portion 21 upon side collision of the vehicle, the tunnel reinforcement member upper portion 51 presses the first floor cross member 20 down from above, as described below. Thus, progress of the upward bending of the first floor cross member 20 is suppressed.

In order to form a closed cross section structure in the deformation starting portion 21 as well, a part of the floor panel 10 directly under the deformation starting portion 21, that is, a central part of the floor panel 10 in the vehicle width direction, is a projecting portion 11 that projects upward along the shape of the base 23 of the deformation starting portion 21.

Referring to FIGS. 1 and 3, the second floor cross member 30 is disposed rearward of the first floor cross member 20. Similar to the first floor cross member 20, a deformation starting portion 31 in which a base 33 is raised, is formed in the second floor cross member 30. The deformation starting portion 31 is a step portion in which a part of the base 33 of the second floor cross member 30 is recessed upward. The deformation starting portion 31 is formed so that a dimension of the deformation starting portion 31 in the vehicle height direction is shorter than a dimension in the vehicle height direction of other areas of the second floor cross member 30 in the vehicle width direction. The base 33 of the second floor cross member 30 indicates a ridge between a vertical wall 34 that stands vertically and a flange 32 that is connected to a lower end of the vertical wall 34 and that extends in the horizontal direction.

The deformation starting portion 31 has, for example, slope portions 31A and a horizontal portion 31B. In each slope portion 31A, the base 33 is gradually raised along the vehicle width direction. In the horizontal portion 31B, the base 33 extends horizontally in the vehicle width direction. For example, the horizontal portion 31B is formed so that a dimension of the horizontal portion 31B in the vehicle height direction is half the dimension in the vehicle height direction of areas of the second floor cross member 30 other than the deformation starting portion 31.

The deformation starting portion 31 is formed at a center portion of the second floor cross member 30 in the vehicle width direction, for example. The rear end flange 56 of the tunnel reinforcement member upper portion 51 that is the reinforcement member is superposed on the deformation starting portion 31. With this configuration, when the upward bending deformation occurs in the second floor cross member 30 starting at the deformation starting portion 31 upon side collision of the vehicle, the rear end flange 56 of the tunnel reinforcement member upper portion 51 presses the second floor cross member 30 down from above, as described below. Thus, progress of the upward bending of the second floor cross member 30 is suppressed.

In order to form a closed cross section structure in the deformation starting portion 31 as well, a part of the floor panel 10 directly under the deformation starting portion 31, that is, the central part of the floor panel 10 in the vehicle width direction, is the projecting portion 11 that projects upward along the shape of the base 33 of the deformation starting portion 31.

Modification of the Embodiment of the Present Disclosure

The battery pack 60 is provided under the floor panel 10. The battery pack 60 has a battery module 61, a wire harness 62, and a case 63 that houses the battery module 61 and the wire harness 62. The battery pack 60 is provided on an under panel 64 that is suspended from and supported by the floor panel 10.

In the case of vehicle side collision, the length of a vehicle in the vehicle width direction may decrease. Thus, the battery pack 60 is formed so that a length of the battery pack 60 in the vehicle width direction is slightly shorter than a length of the floor panel 10 in the vehicle width direction, and the battery pack 60 is disposed on an inner side (nearer to the center) with respect to both ends of the vehicle in the width direction.

The battery module 61 includes a plurality of battery cells (single battery). For example, a plurality of battery groups each having the battery cells connected in parallel is prepared, and the battery groups are connected with each other in series. The battery cells are nickel-hydrogen secondary batteries, lithium-ion secondary batteries, or all-solid batteries etc.

The case 63 houses the battery module 61 and the wire harness 62 inside. Referring to FIGS. 2 and 3, in an upper wall of the case 63, a projecting portion 65 that projects upward along the shape of the bases 23, 33 of the deformation starting portions 21, 31 is formed directly under the deformation starting portions 21, 31 of the first floor cross member 20 and the second floor cross member 30.

A distance between the projecting portion 65 of the case 63 and the battery module 61 in the vehicle height direction is longer, compared to a distance between other areas of the case 63 in the vehicle width direction and the battery module 61. Thus, a clearance between the projecting portion 65 and the battery module 61 has a larger margin, compared to the other areas. The wire harness 62 is routed through the clearance between the projecting portion 65 and the battery module 61.

The wire harness 62 is a high voltage wiring that connects the battery cells. The clearance between the projecting portion 65 and the battery module 61 is generated with the formation of the deformation starting portions 21, 31 of the first floor cross member 20 and the second floor cross member 30. Using the clearance as a routing space for the wire harness 62, it is possible to suppress enlargement of the battery pack 60.

Movement During Vehicle Side Collision

Figure 4:
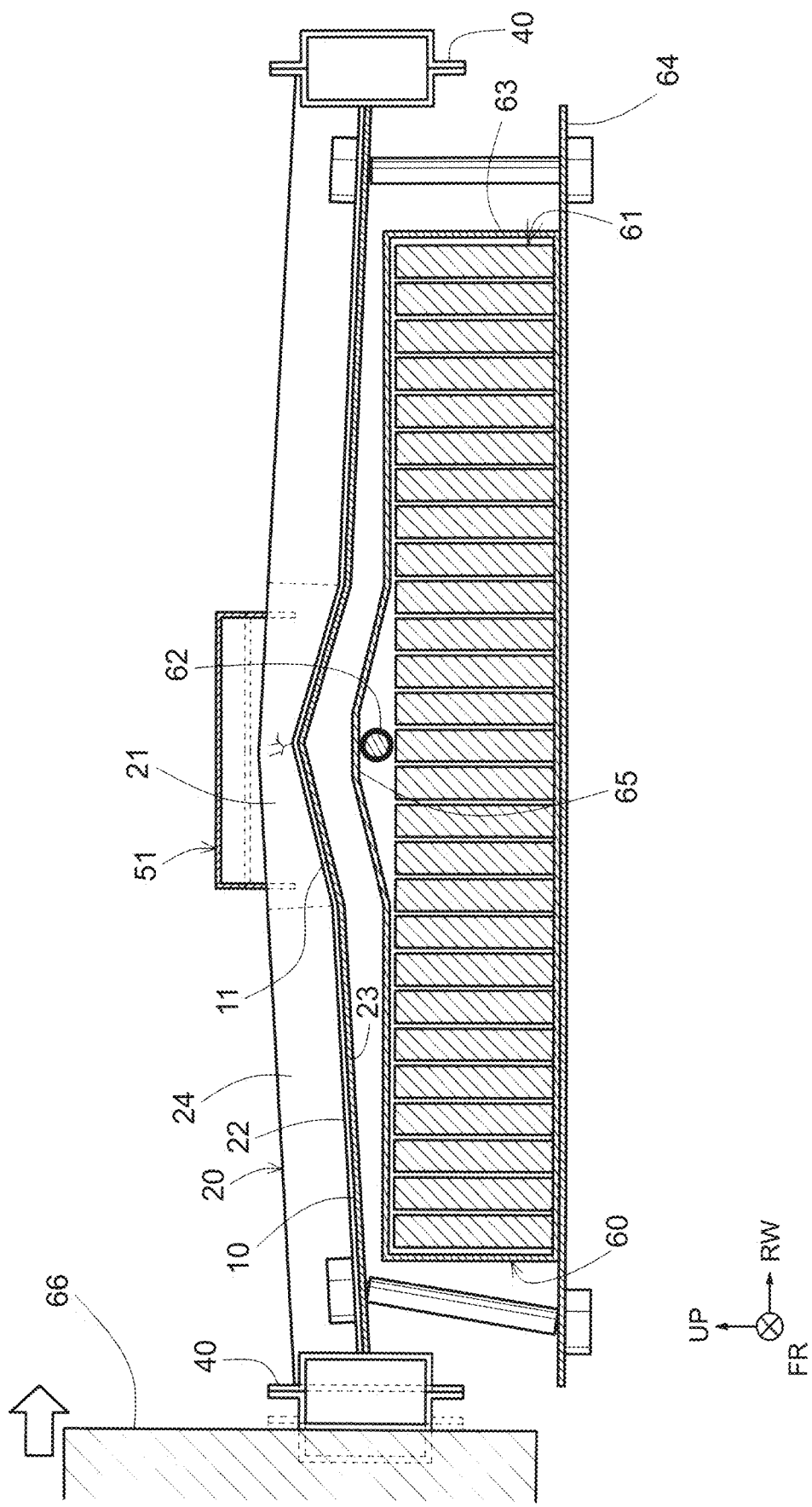
FIG. 4 is a sectional rear view for explaining the bending and deformation of a first floor cross member upon vehicle side collision.
Figure 5:
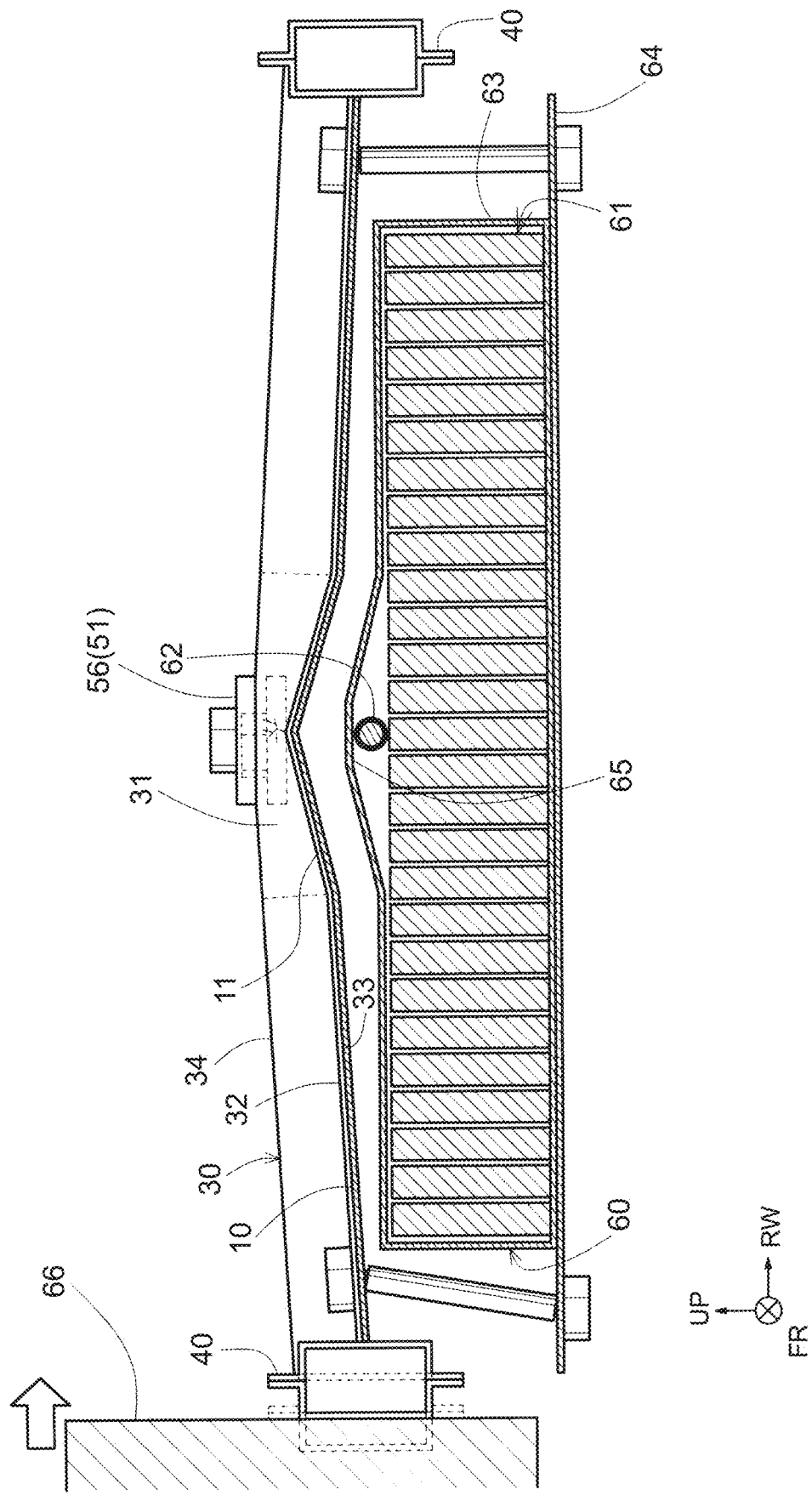
FIG. 5 is a sectional rear view for explaining the bending and deformation of a second floor cross member upon vehicle side collision.

Referring to FIGS. 4 and 5, the movement of the vehicle floor structure according to the present embodiment during vehicle side collision will be described. FIG. 4 illustrates the structure in FIG. 2 at the time of side collision. FIG. 5 illustrates the structure in FIG. 3 at the time of side collision.

When a vehicle side surface collides with an obstacle 66 (barrier), the rocker beam 40 receives a collision load. The collision load is transferred to the first floor cross member 20 and the second floor cross member 30 that are the skeleton members of which the end portions in the vehicle width direction are connected to the rocker beams 40.

When the collision loads input to the first floor cross member 20 and the second floor cross member 30 exceed the respective withstand loads, the first floor cross member 20 and the second floor cross member 30 are bent and deformed. The bending and deformation occur, starting at the deformation starting portions 21, 31 of the first floor cross member 20 and the second floor cross member 30.

As described above, since the bases 23, 33 of the deformation starting portions 21, 31 are raised, the first floor cross member 20 and the second floor cross member 30 are bent and deformed upwards (upward bending). The tunnel reinforcement member upper portion 51 is provided over the deformation starting portions 21, 31. The deformation starting portions 21, 31 become peaks of the first floor cross member 20 and the second floor cross member 30 when they are bent upwards. That is, the deformation starting portions 21, 31 are portions that are raised upwards the most within the first floor cross member 20 and the second floor cross member 30. Thus, in the deformation starting portions 21, 31, raised portions are pressed down by the tunnel reinforcement member upper portion 51. In this way, progress of upward bending of the first floor cross member 20 and the second floor cross member 30 is suppressed.

What is claimed is:

1. A vehicle floor structure comprising:
a floor panel;
a battery pack disposed under the floor panel;
a floor cross member disposed on the floor panel, wherein:
the floor cross member extends from one end to the other end of the floor panel in a vehicle width direction;
the floor cross member includes a deformation starting portion with a raised base; and
a dimension, in a vehicle height direction, of the deformation starting portion of the floor cross member is shorter than a dimension, in the vehicle height direction, of an area of the floor cross member other than the deformation starting portion in the vehicle width direction; and
a reinforcement member that is disposed so as to be superposed on the deformation starting portion, wherein the floor cross member extends through the reinforcement member to extend from the one end of the floor panel to the other end of the floor panel in the vehicle width direction.

2. The vehicle floor structure according to claim 1, wherein:
the battery pack includes a battery module and a case that houses the battery module;
the case and the floor panel each have a projecting portion that projects upward along the base of the deformation starting portion at a part that is located under the deformation starting portion of the floor cross member; and
the battery pack includes a wire harness that is routed through a clearance between the projecting portion of the case and the battery module housed in the case.

3. The vehicle floor structure according to claim 1, further comprising:
a floor tunnel extending in a vehicle front-rear direction, the floor tunnel being located forward from the floor cross member in the floor panel in the vehicle front-rear direction,
wherein
the reinforcement member covers the floor tunnel, and a rear end of the reinforcement member is located rearward from a rear end of the floor tunnel.

4. A vehicle floor structure comprising:
a floor panel;
a battery pack disposed under the floor panel; and
a floor cross member disposed on the floor panel, wherein:
the floor cross member extends from one end to the other end of the floor panel in a vehicle width direction;
the floor cross member includes a deformation starting portion with a raised base;
a dimension, in a vehicle height direction, of the deformation starting portion of the floor cross member is shorter than a dimension, in the vehicle height direction, of an area of the floor cross member other than the deformation starting portion in the vehicle width direction;
the battery pack includes a battery module and a case that houses the battery module;

the case and the floor panel each have a projecting portion that projects upward along the base of the deformation starting portion at a part that is located under the deformation starting portion of the floor cross member; and the battery pack includes a wire harness that is routed through a clearance between the projecting portion of the case and the battery module housed in the case.

* * * * *